United States Patent
Tsai et al.

(10) Patent No.: US 7,430,028 B2
(45) Date of Patent: Sep. 30, 2008

(54) VIEWING-ANGLE ADJUSTABLE LIQUID CRYSTAL DISPLAY AND METHOD FOR ADJUSTING THE SAME

(75) Inventors: Meng-Chang Tsai, Chiayi (TW); Yung-Lun Lin, Wujie Township, Yilan County (TW); Chih-Ming Chang, Jhongli (TW)

(73) Assignee: AU Optronics Corp., Hsin-Chu (TW)

( * ) Notice: Subject to any disclaimer, the term of this patent is extended or adjusted under 35 U.S.C. 154(b) by 543 days.

(21) Appl. No.: 11/086,542

(22) Filed: Mar. 22, 2005

(65) Prior Publication Data

US 2006/0109396 A1 May 25, 2006

(30) Foreign Application Priority Data

Nov. 19, 2004 (TW) .............................. 93135766 A (51) Int. Cl.
*G02F 11/1335* (2006.01)
(52) U.S. Cl. .............................. 349/65; 349/61; 349/62; 349/63; 349/64; 349/66; 349/67; 349/68; 349/69; 349/70; 349/71
(58) Field of Classification Search .................. 349/65, 349/61–71, 74
See application file for complete search history.

(56) References Cited

U.S. PATENT DOCUMENTS

| | | | |
|---|---|---|---|
| 5,831,698 A * | 11/1998 | Depp et al. .................... 349/64 |
| 5,877,829 A | 3/1999 | Okamoto et al. ............... 349/74 |
| 5,956,107 A * | 9/1999 | Hashimoto et al. ............ 349/64 |
| 6,239,853 B1 | 5/2001 | Winker et al. ................ 349/117 |
| 6,398,370 B1 | 6/2002 | Chiu et al. .................... 359/613 |
| 6,445,434 B2 | 9/2002 | Takato et al. ................. 349/123 |
| 6,447,132 B1 * | 9/2002 | Harter, Jr. ...................... 362/29 |
| 6,842,204 B1 * | 1/2005 | Johnson ........................ 349/74 |
| 7,154,570 B2 * | 12/2006 | Lee ............................... 349/58 |
| 7,193,666 B2 * | 3/2007 | Choi et al. ..................... 349/74 |
| 7,223,005 B2 * | 5/2007 | Lamb et al. .................. 362/615 |
| 2002/0018341 A1 | 2/2002 | Hiroshi et al. |
| 2003/0043315 A1 * | 3/2003 | Umemoto et al. ............. 349/65 |

FOREIGN PATENT DOCUMENTS

| | | |
|---|---|---|
| EP | 1180641 | 2/2002 |
| JP | 10097199 | 4/1998 |
| JP | 2002124112 | 4/2002 |
| TW | 200420972 | 10/2004 |

* cited by examiner

*Primary Examiner*—David C. Nelms
*Assistant Examiner*—Thanh-Nhan P Nguyen
(74) *Attorney, Agent, or Firm*—Thomas, Kayden, Horstemeyer & Risley (57) ABSTRACT

A viewing-angle adjustable liquid crystal display includes a display panel, a backlight unit, and a sidelight unit. The backlight unit is located under the sidelight unit, and the sidelight unit is disposed under the display panel. The sidelight unit includes a first sidelight source and a light-guide plate. The first sidelight source is disposed at one end of the light-guide plate. The displaying method includes providing direct light to the display panel in response to the narrow-viewing-angle-mode signal; and providing scattering light to the display panel in response to the wide-viewing-angel-mode signal.

11 Claims, 8 Drawing Sheets

VIEWING-ANGLE ADJUSTABLE LIQUID CRYSTAL DISPLAY AND METHOD FOR ADJUSTING THE SAME

This application claims the benefit of Taiwan application Ser. No. 93135766, filed Nov. 19, 2004, the subject matter of which is incorporated herein by reference.

BACKGROUND OF THE INVENTION

1. Field of the Invention

The invention relates in general to a viewing-angle adjustable liquid crystal display and method for adjusting same, and more particularly to a viewing-angle adjustable liquid crystal display, which can provide the required viewing-angle mode for the user by electrical signal switching, and method for adjusting same.

2. Description of the Related Art

As technology makes progress, consumers have more opportunities of using mobile devices equipped with liquid crystal displays, such as mobile phones or notebook computers, in public regions. As using the mobile device in a public region, the consumers often need the mobile device to have a viewing-angle adjustable display so as to keep his/her secret. At present, there are three kinds of well-known liquid crystal display viewing-angle control methods.

Figure 1:
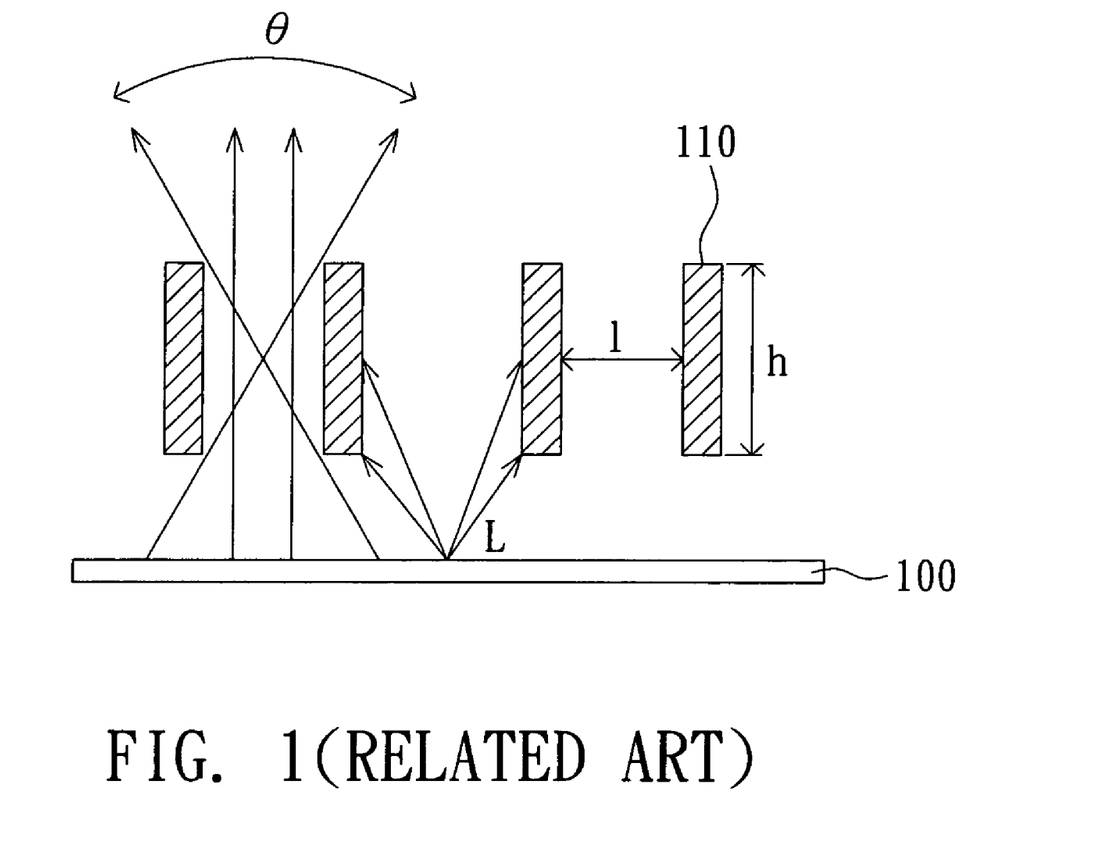
FIG. 1 is a schematic diagram of using shutter structure to adjust the liquid crystal display viewing-angle.

FIG. 1 is a schematic diagram of using shutter structure to adjust the liquid crystal display viewing-angle. Referring to FIG. 1, the shutter structure 110 is disposed in front of the liquid crystal display 100 and has the shutters arranged in parallel. By adjusting the height h of the shutter structure 110 and the distance I between two adjacent shutters, the light L emitted by the display 100 can be restricted to reach eyes of the observers at some specific viewing-angles. Therefore, only within the viewing angle region spreading the angle ⊖ as shown in the figure, the light L can pass the absorbing materials 110 and the observer at these viewing angles can thus see the images on the display 100 while the light L emitted beyond the viewing-angle region of the angle ⊖, will be absorbed by the absorbing materials 110.

However, the viewing-angle control method has the following disadvantages. The shutter structure 110, as used, should be additionally configured at the exterior of the display, thereby causing the inconvenience in usage. Since a part of the light L is absorbed by the shutter structure 110, the display luminance will be lowered down at least a half. Moreover, the shutter structure 110 can only provide a left side viewing-angle mode or a right side viewing-angle mode, which will not meet the user's requirement of various viewing-angle modes, for example, only the users at the front view and the left-side view can observe the displayed images.

Figure 2A:
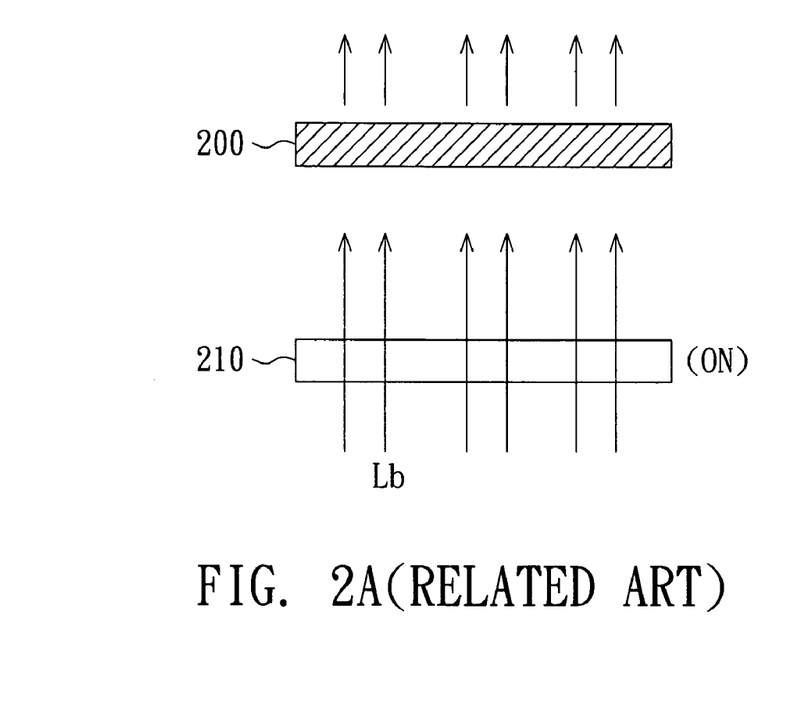
FIG. 2A and FIG. 2B are schematic diagrams of using light scattering device to adjust the liquid crystal display viewing-angle.
Figure 2B:
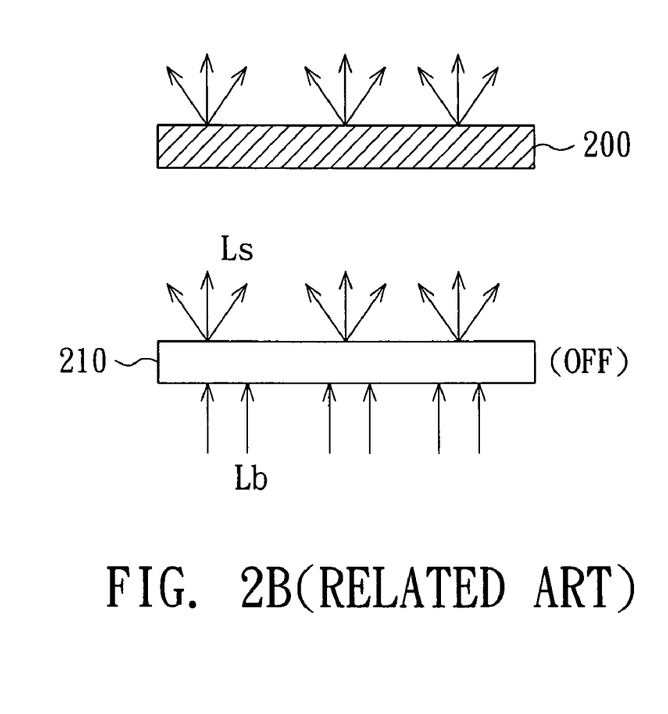

FIG. 2A and FIG. 2B are schematic diagrams of using a light scattering device to adjust the liquid crystal display viewing-angle in prior art. The light scattering device 210, such as a polymer dispersed liquid crystal (PDLC) layer, in which light scattering features can be adjusted, is disposed between the parallel backlight (Lb) device (not shown in the figure) and the liquid crystal cell 200. By adjusting the voltage applied to the light scattering device 210, the narrow viewing-angle mode and the wide viewing-angle mode can be provided. As shown in FIG. 2A, under the narrow viewing-angle mode, the light scattering device 210 is in the power on state, and appears transparent so that the backlight Lb is maintained parallel after passing the light scattering device 210 to reach the liquid crystal cell 200. Therefore, only the front view observer can see the displayed images. As shown in FIG. 2B, under the wide viewing-angle mode, the light scattering device 210 is in the power off state, the backlight Lb is scattered to form the scattering light Ls and enter the liquid crystal layer 200 so that the observers at every viewing angle can see the displayed images.

However, this viewing angle control method has the following disadvantages. When the light scattering device 210 is switched to the power on state, a part of the backlight Lb will be reflected as passing the light scattering device 210, thereby reducing the luminance of the liquid crystal panel 200. In addition, as the above-mentioned example, this viewing angle control method can only provide the narrow viewing angle mode for front view observers, but not for the user at any other viewing angle, thereby reducing the available options in viewing-angle adjusting.

Figure 3A:
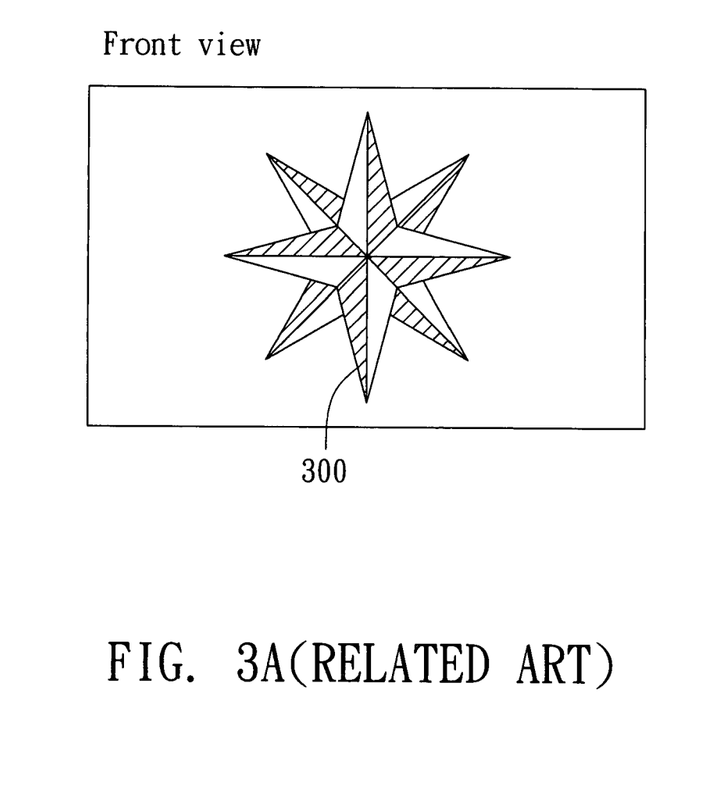
FIG. 3A and FIG. 3B are schematic diagrams of controlling viewing angles by using an extra alignment layer.
Figure 3B:
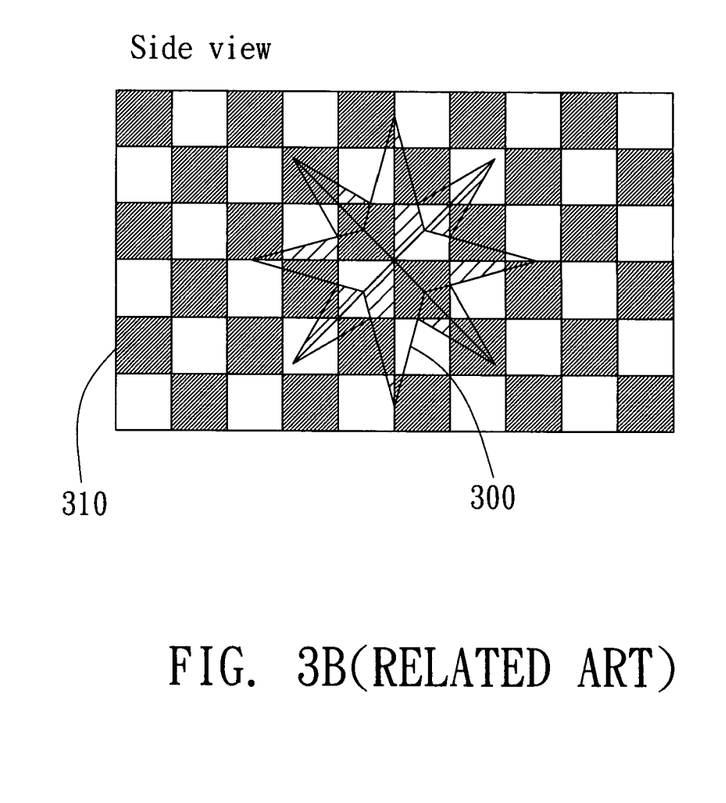

FIG. 3A and FIG. 3B are schematic diagrams of controlling viewing angles by using an extra alignment layer in the prior art. By adjusting the rubbing direction of the alignment layer additionally disposed on the liquid crystal display, a wide viewing angle mode and a narrow viewing angle mode can be provided. As shown in FIG. 3A, under the narrow viewing-angle mode, the front view observer can see the displayed image 300 while the side view observer cannot distinguish the display image 300 for a specific picture 310 having bright and dark stripes in turn covers the image 300 as shown in FIG. 3B. By doing so, the viewing-angle adjusting purpose can be achieved.

However, as shown in the above-mentioned three examples, the present viewing angle adjustable liquid crystal display structures have the disadvantage of the luminance and bright contrast deviation as the viewing angle modes are switched. Also they cannot provide the narrow viewing angle mode for users at other viewing-angles except the front view ones. Therefore, such viewing angle adjusting methods are not satisfied.

SUMMARY OF THE INVENTION

It is therefore an object of the invention to provide a viewing-angle adjustable liquid crystal display and method for adjusting same. The light valve is disposed between the backlight module and the liquid crystal panel and a sidelight unit is disposed between the light valve and the liquid crystal panel. As the display operates in the wide viewing-angle mode, the backlight module and the sidelight unit are powered on while in the narrow viewing-angle mode only the backlight module or the sidelight unit is powered on. Therefore, the display can provide the required viewing-angle mode for the user.

The invention achieves the above-identified object by providing a viewing angle adjustable liquid crystal display including a display panel, a sidelight unit, and a backlight unit. The sidelight unit, disposed under the display panel, includes a light guide plate and a first sidelight source. The first sidelight source is disposed at one end of the light guide plate. The backlight unit is disposed under the sidelight unit.

The invention achieves the above-identified object by providing a method for adjusting the viewing angle of a liquid crystal display. The method includes providing direct light to the display panel in response to a narrow-viewing-angle-mode signal; and providing scattering light to the display panel in response to a wide-viewing-angle-mode signal.

Other objects, features, and advantages of the invention will become apparent from the following detailed description of the preferred but non-limiting embodiments. The following description is made with reference to the accompanying drawings.

DETAILED DESCRIPTION OF THE INVENTION

In the following description, two embodiments are taken as examples for the viewing angle adjustable liquid crystal display of the invention.

Embodiment One

Figure 4A:
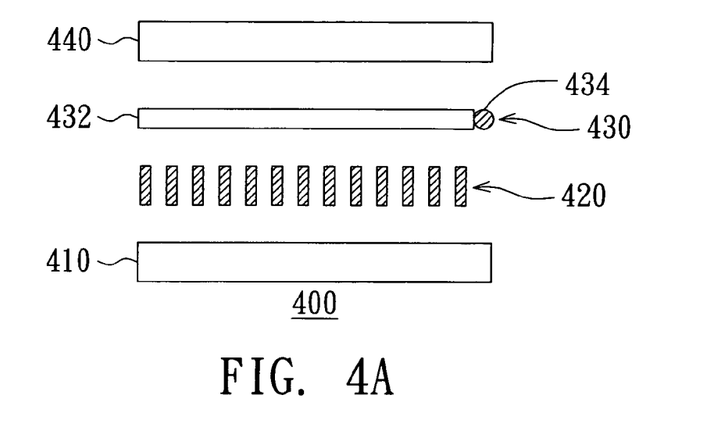
FIG. 4A is a schematic cross-sectional view of the liquid crystal display according to the first embodiment of the invention.

Referring to FIG. 4A, a schematic cross-sectional view of the liquid crystal display according to the first embodiment of the invention is shown. The liquid crystal display 400 includes a backlight module 410, a light valve 420, a sidelight unit 430, and a display panel 440. The backlight module 410 can be a bottom lighting backlight module or a side lighting backlight module. The light valve 420 can be shutter structure made of light absorbing materials for confining the passing light within a specific region to generate approximately parallel light. The sidelight unit 430 includes a transparent light-guide plate 432 and a sidelight source 434, such as lamps or light emitting diodes. The scattering light-guide plate 432 can be passed by the backlight generated from the backlight module 410 and can be used to scatter the light generated from the sidelight unit 434 to the display panel 440.

Figure 4B:
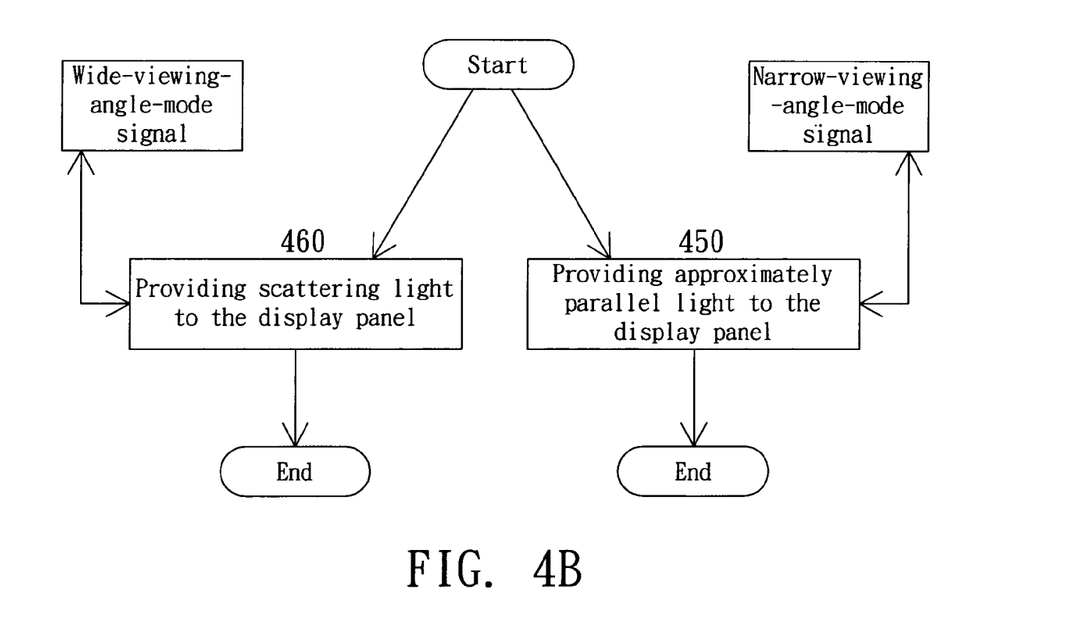
FIG. 4B is a flow chart of the method for adjusting the viewing angle of the liquid crystal display according to the first embodiment of the invention.

Referring to FIG. 4B, a flow chart of the method for adjusting the viewing angle of the liquid crystal display according to the first embodiment of the invention is shown. First, in step 450, switch off the sidelight source 434 and provide the approximately parallel backlight to the display panel 440 by using the backlight module 410 and the light valve 420 in response to a narrow-viewing-angle-mode signal. In step 460, provide scattering light to the display panel 440 by using the light-guide plate 432 to scatter the sidelight generated from the sidelight source 434 in response to a wide-viewing-angle-mode signal.

Figure 4C:
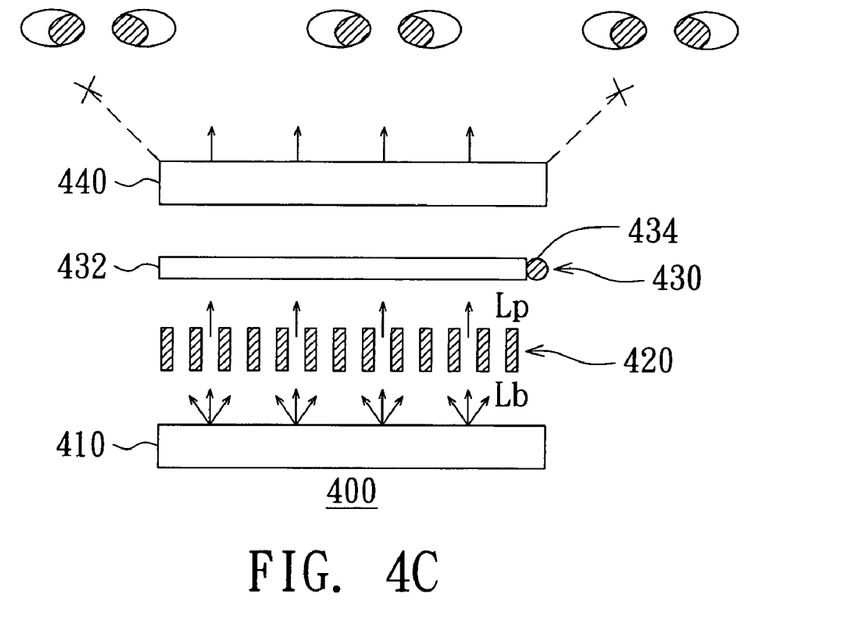
FIG. 4C is a schematic cross-sectional view of the liquid crystal display operating under the narrow viewing-angle mode in FIG. 4A.

Referring to FIG. 4C, a schematic cross-sectional view of the liquid crystal display operating under the narrow viewing-angle mode in FIG. 4A is shown. Under the narrow viewing-angle mode, the sidelight source 434 is switched off while the backlight module 410 is switched on. When the backlight Lb emitted from the backlight module 410 enters the light valve 420, only the backlight Lb within a small viewing-angle region can pass the light valve 420 to form the approximately parallel backlight Lp. Therefore, only the front-view observer can see the information on the display 400 while observers at two sides cannot see anything.

Figure 4D:
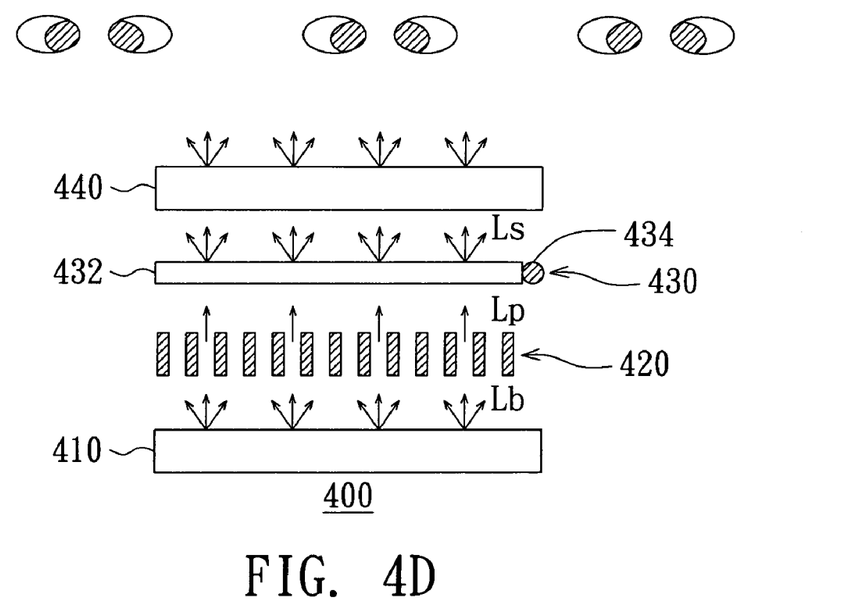
FIG. 4D is a schematic cross-sectional view of the liquid crystal display operating under the wide viewing-angle mode in FIG. 4A

Referring to FIG. 4D, a schematic cross-sectional view of the liquid crystal display operating under the wide viewing-angle mode in FIG. 4A is shown. Under the wide viewing-angle mode, the backlight module 410 and the sidelight unit 434 are both switched-on. The backlight Lb passes the light valve 420 to form the approximately parallel backlight Lp while the light emitted by the sidelight source 434 is scattered by the light-guide plate 432 to form the scattering light Ls and enter the observer's eyes via the display panel 440. Therefore, no matter at the front view or at the side view, observers can see the information on the display 400.

Furthermore, when the display 400 is operated at the narrow viewing-angle mode, for only the backlight module 410 is powered on, the luminance of the display 400 will be lower than that in wide viewing-angle mode. The luminance of the display 400 in the narrow viewing-angle mode can be adjusted to be the same with that in the wide viewing-angle mode by increasing the operation currents of the backlight module 410 so that users will not feel apparent luminance difference between these two modes.

Embodiment Two

Figure 5A:
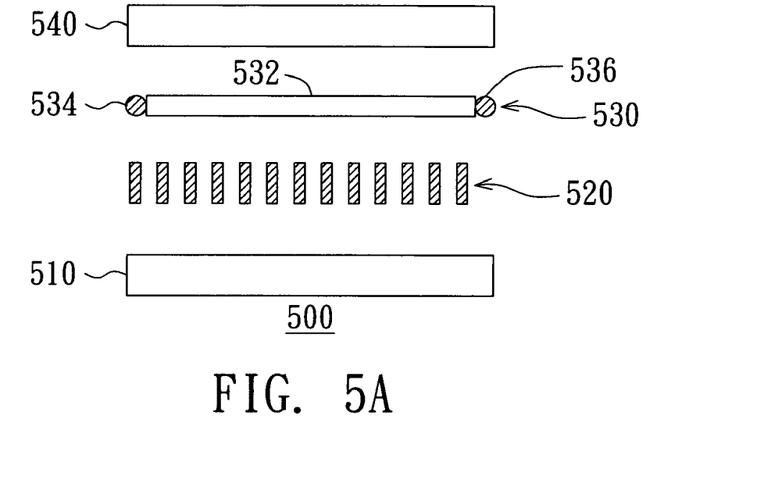
FIG. 5A is a schematic cross-sectional view of the liquid crystal display according to the second embodiment of the invention.
Figure 5B:
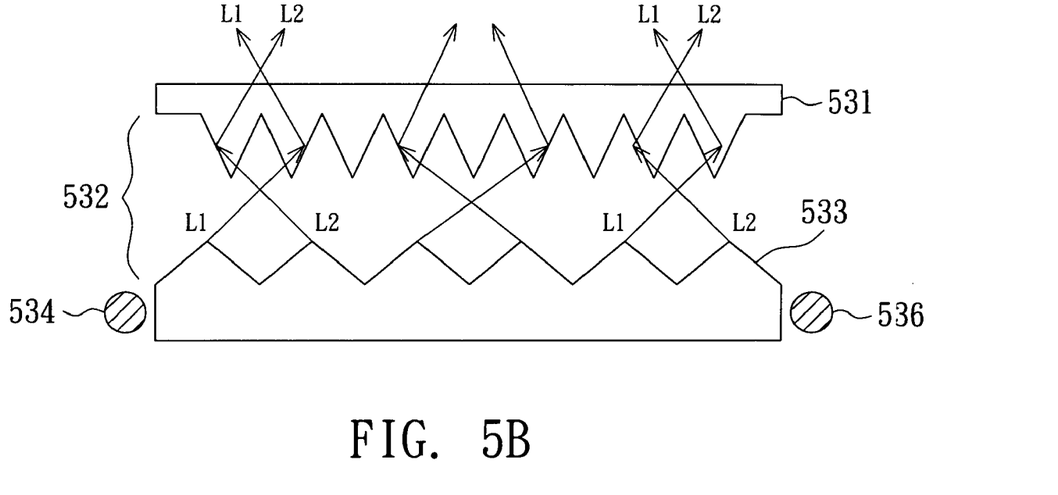
FIG. 5B is a schematic diagram of geometrical structure of the light-guide plate in FIG. 5A.

Referring to FIG. 5A, a schematic cross-sectional view of the liquid crystal display according to the second embodiment of the invention is shown. The liquid crystal display 500 includes a backlight module 510, a light valve 520, a sidelight unit 530, and a display panel 540. The backlight module 510 can be a bottom lighting backlight module or a side lighting backlight module. The light valve 520 is shutter structure made of light absorbing materials for confining the passing light within a specific region to form approximately parallel light. The sidelight unit 530 includes a transparent and directional light-guide plate 532, a first sidelight source 534, and a second sidelight source 536. The first and the second sidelight sources 534 and 536 are such as lamps or light emitting diodes. The light emitted from the backlight module 510 can pass through the light-guide plate 532. Moreover, as shown in FIG. 5B, the light-guide plate 532 includes a first thin film 531 and a second thin film 533. By using the specific geometric structure of the first and the second thin films 531 and 533, the light L1 emitted from the first sidelight source 534 can be guided to enter the display panel 540 at a direction deviated left from the vertical while the light L2 emitted from the second sidelight source 536 be guided to enter the display panel 540 at a direction deviated right from the vertical.

Figure 5C:
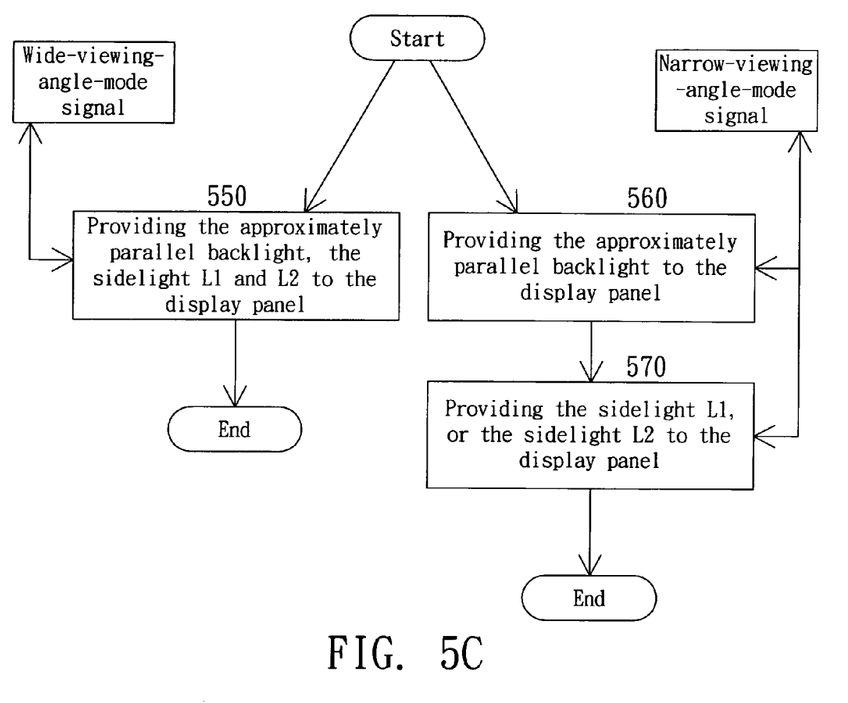
FIG. 5C is a flow chart of the method for adjusting the viewing angle of the liquid crystal display according to the second embodiment of the invention.

Referring to FIG. 5C, a flow chart of the method for adjusting the viewing angle of the liquid crystal display according to the second embodiment of the invention is shown. First, in step 550, provide the approximately parallel backlight, the sidelight L1 and L2 to the display panel 540 by respectively using the backlight module 510, the light valve 520, and the first sidelight source 534, the second sidelight source 536 in response to a wide-viewing-angle-mode signal. In step 560, provide the approximately parallel backlight, and in step 570, provide the sidelight L1, or the sidelight L2 to the display panel 540 by using the backlight module 510 and the light valve 520, the first sidelight source 534, or the second sidelight source 536 in response to a narrow-viewing-angle-mode signal.

Figure 5D:
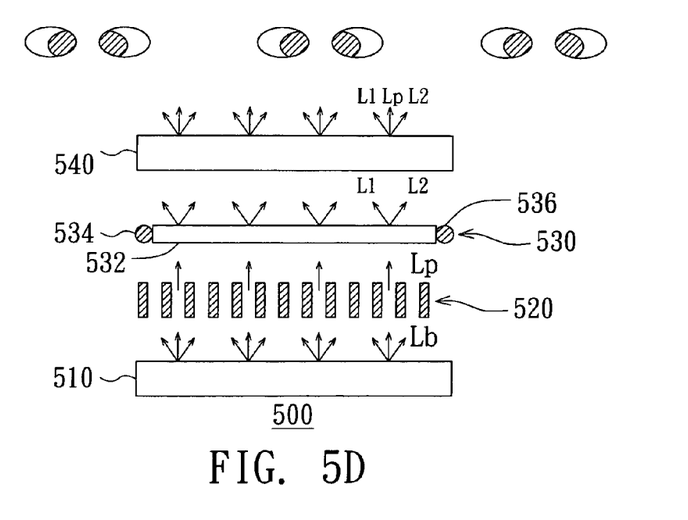
FIG. 5D is a schematic cross-sectional view of the liquid crystal display operating under the wide viewing-angle mode in FIG. 5A.

Referring to FIG. 5D, a schematic cross-sectional view of the liquid crystal display operating under the wide viewing-angle mode in FIG. 5A is shown. Under the wide viewing-angle mode, the backlight module 510, the first sidelight source 534 and the second sidelight source 536 are all powered on. The backlight Lb emitted from the backlight module 510 passes the light valve 520 to form the approximately parallel backlight Lp, and the backlight Lp further passes through the transparent light-guide plate 532 to enter the display panel 540. The light L1 emitted from the first sidelight source 534 is guided by the light-guide plate 532 to enter the display panel 540 at a direction deviated left from the vertical while the light L2 emitted from the second sidelight source 536 is guided by the light-guide plate 532 to enter the display panel 540 at a direction deviated right from the vertical. Therefore, the observers at the front view, the left-side view, and the right-side view, can see the information on the display 500 at the same time, thereby achieving the wide viewing-angle purpose.

Figure 5E:
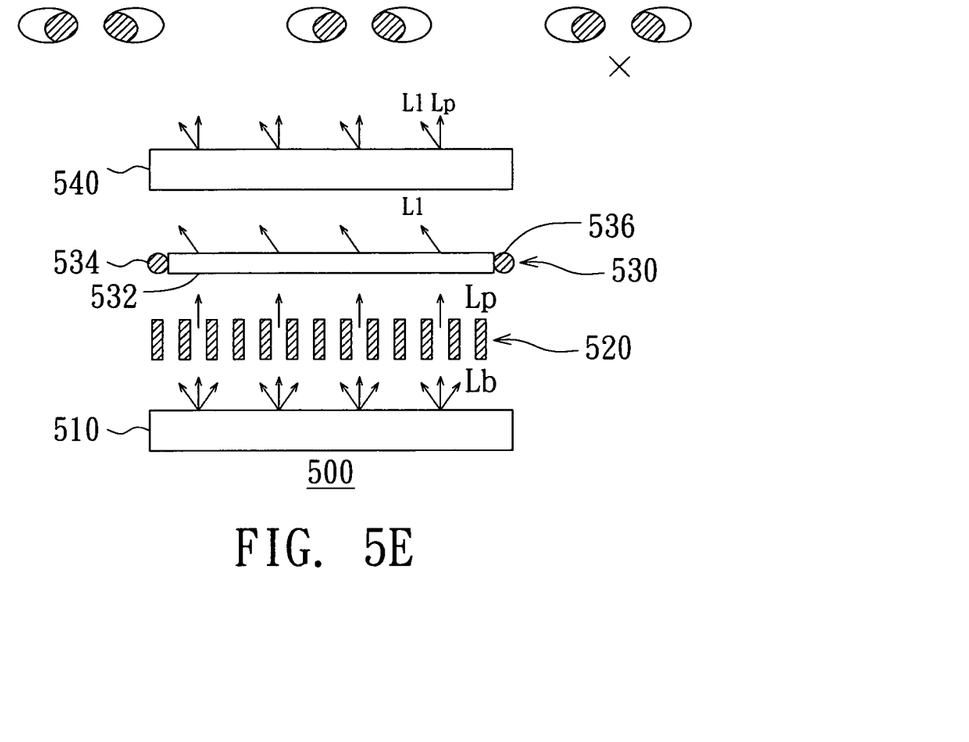
FIG. 5E is a schematic cross-sectional view of the liquid crystal display operating under the narrow viewing-angle mode whose images can only be seen by the front-view and left-side view observers in FIG. 5A.

Referring to FIG. 5E, a schematic cross-sectional view of the liquid crystal display operating under the narrow viewing-angle mode whose images can only be seen by the front-view and left-side view observers in FIG. 5A is shown. Under the narrow viewing-angle mode, the backlight module 510, the first sidelight source 534, and the second sidelight source 536 are not switched on at the same time. As shown in FIG. 5E, the backlight module 510 and the first sidelight source 534 are switched on while the second sidelight source 536 is switched off. Therefore, as mentioned above, it can be similarly reasoned that only the light L1 emitted from the first sidelight source 534 and the backlight Lp passing the light valve 520 can pass the display panel 540, and thus only the front-view and the left-side view observers can see the display images while the right-side view observer cannot see anything.

Figure 5F:
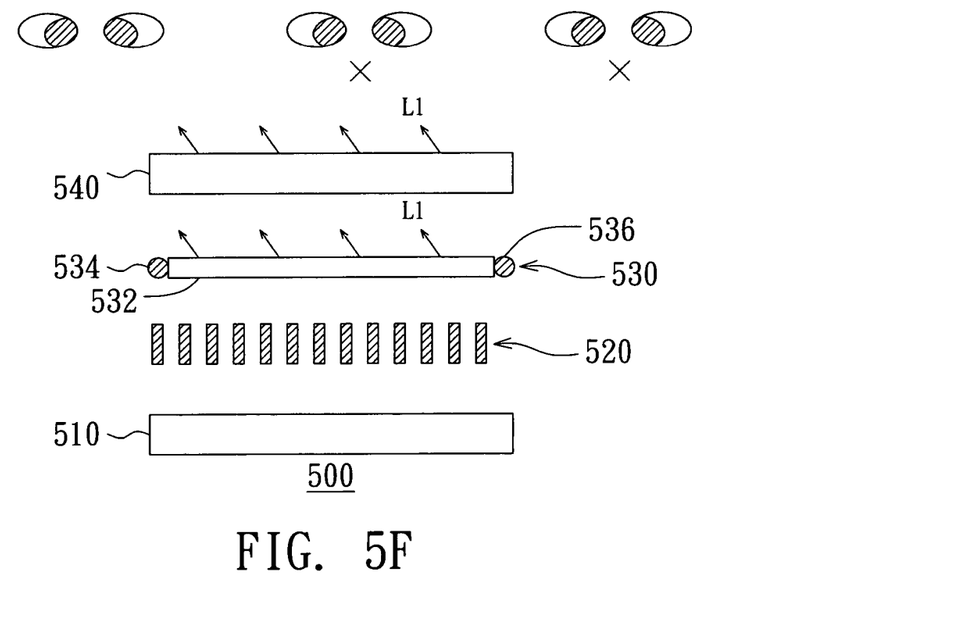
FIG. 5F is a schematic cross-sectional view of the liquid crystal display operating under the narrow viewing-angle mode whose images can only be seen by the left-side view observers.

Referring to FIG. 5F, a schematic cross-sectional view of the liquid crystal display operating under the narrow viewing-angle mode whose images can only be seen by the left-side view observers is shown. The backlight module 510 and the second sidelight source 536 are switched off while the first sidelight source 534 is switched on. As a result, as mentioned above, only the light L1 emitted from the first sidelight source 534 can pass the display panel 540, and thus only the left-side view observer can see the displayed images while the front-view and the right-side view observers cannot see anything. Therefore, the display 500 can provide the required viewing angle mode for the user by switching the backlight module 510, the first sidelight source 534, and the second sidelight source 536.

In addition, when the display 500 is operated under the narrow viewing-angle mode, for the backlight module 510, the first sidelight source 534, and the second sidelight source 536 are not switched on at the same time, the luminance of the display 500 will be lower than that under the wide viewing-angle mode. The luminance of the display 500 in the narrow viewing-angle mode can be adjusted to be the same with that in the wide viewing-angle mode by increasing the operation currents of the backlight module 510, the first sidelight source 534 or the second sidelight source 536. Therefore, the observers will not feel apparent display luminance difference between two modes.

As mentioned above, although the backlight module equipped with the light valve to generate the approximately parallel light is taken as an example in the invention, the liquid crystal display of the invention can also use other kinds of backlight device to generate the approximately parallel light. Moreover, the relative configuration of the backlight device and the sidelight unit is not restricted to be that the sidelight unit is disposed above the backlight device as shown in FIG. 4A and FIG. 5A. The sidelight unit can also be disposed under the backlight device. Since the approximately parallel light and the sidelight can be selectively generated to provide the required narrow and wide viewing angle modes and achieve the viewing angle adjusting purpose, it will not be deviated from the scope of skills in the invention.

The liquid crystal display of the invention disclosed by the above-mentioned two embodiments has the following advantages. The sidelight unit can not only provide the backlight to pass and enter the display panel but also guide the sidelight to reach observers at various viewing angles. Therefore, under the wide viewing-angle mode, the front-view and two-side view observers can see the information on the display while under the narrow viewing-angle mode only the front-view, the left-side view, or the right-side view observer can see the displayed information, thereby effectively achieving the viewing angle adjusting purpose.

While the invention has been described by way of example and in terms of two preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A viewing angle adjustable liquid crystal display, comprising:
   a display panel;
   a sidelight unit, disposed under the display panel, comprising:
      a light-guide plate; and
      a first sidelight source, disposed at one end of the light-guide plate; and
   a backlight unit, disposed under the sidelight unit, wherein the backlight unit comprises a backlight module, and a light valve disposed between the backlight module and the sidelight unit.

2. The liquid crystal display according to claim 1, wherein the light valve is comprised of light absorbing material.

3. The liquid crystal display according to claim 1, wherein the light valve is comprising of shutter structure.

4. The liquid crystal display according to claim 1, wherein the sidelight unit further comprises a second sidelight source disposed at the other end of the light-guide plate.

5. The liquid crystal display according to claim 4, wherein the light-guide plate comprises a directional light-guide plate.

6. A method for adjusting the viewing-angle of a liquid crystal display having a display panel, a backlight unit and a sidelight unit, the method comprising:
   providing direct light from at least one of the backlight unit and the sidelight unit to the display panel in response to a narrow-viewing-angle-mode signal; and
   providing scattering light from both of the direct light from the backlight unit and sidelight from the sidelight unit to the display panel in response to a wide-viewing-angle-mode signal.

7. The method according to claim 6, wherein the direction of the direct light is substantially non-perpendicular to the display panel.

8. The method according to claim 7, further comprising providing approximately parallel light to the display panel in response to the narrow-viewing-angle-mode signal.

9. The method according to claim 6, further comprising providing approximately parallel light to the display panel in response to the narrow-viewing-angle-mode signal.

10. The method according to claim 6, further comprising adjusting the brightness of the display panel by increasing the current through the backlight unit in response to the narrow-viewing-angle-mode signal.

11. The method according to claim 6, further comprising adjusting the brightness of the display panel by increasing the current through the sidelight unit in response to the narrow-viewing-angle-mode signal.

* * * * *